(12) United States Patent
Lu et al.

(10) Patent No.: US 12,028,198 B2
(45) Date of Patent: Jul. 2, 2024

(54) PHASE TRACKING REFERENCE SIGNAL FOR 6G WIRELESS COMMUNICATION

(71) Applicant: Intel Corporation, Santa Clara, CA (US)

(72) Inventors: Peng Lu, Elk Grove, CA (US); Alexei Davydov, Nizhny Novgorod (RU); Jong-Kae Fwu, Sunnyvale, CA (US); Sungho Moon, San Jose, CA (US); Xiangyang Zhuang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 17/499,094

(22) Filed: Oct. 12, 2021

(65) Prior Publication Data

US 2022/0029870 A1 Jan. 27, 2022

Related U.S. Application Data

(60) Provisional application No. 63/091,189, filed on Oct. 13, 2020.

(51) Int. Cl.
*H04L 27/26* (2006.01)
*H04J 13/00* (2011.01)
*H04L 5/00* (2006.01)

(52) U.S. Cl.
CPC ........ *H04L 27/2613* (2013.01); *H04J 13/004* (2013.01); *H04J 13/0062* (2013.01); *H04L 5/0048* (2013.01); *H04L 27/2636* (2013.01)

(58) Field of Classification Search
CPC .............. H04L 27/2613; H04L 5/0048; H04L 27/2636; H04L 5/0035; H04L 27/26134; H04L 27/26526; H04J 13/004; H04J 13/0062; H04J 11/00
See application file for complete search history.

(56) References Cited

U.S. PATENT DOCUMENTS

| 8,503,420 | B2 * | 8/2013 | Lin | H04L 5/0007 370/344 |
| 2008/0080631 | A1 * | 4/2008 | Forenza | H04B 7/0684 375/260 |
| 2011/0026639 | A1 * | 2/2011 | Rouquette-Leveil | H04B 7/0671 375/295 |
| 2011/0149942 | A1 * | 6/2011 | Ko | H04B 7/0413 375/295 |
| 2012/0140718 | A1 * | 6/2012 | Jiang | H04W 24/10 370/329 |

(Continued)

*Primary Examiner* — Julio R Perez
(74) *Attorney, Agent, or Firm* — Schwegman Lundberg & Woessner, P.A.

(57) ABSTRACT

An apparatus and system to compensate for phase noise in a 5G or 6G DFT-S-OFDM signal are described. An access port (AP)-specific orthogonal cover code (OCC) is applied to phase tracking reference signal (PTRS) symbols in each of a plurality of PTRS groups. The PTRS group are inserted between data symbols to form a data vector prior to perform transform precoding on the data vector and transmission to a UE. The UE extracts the PTRS symbols from different PTRS APs using the OCC specific to each AP. After extraction, the phase noise for each PTRS group is estimated and used to compensate the data symbols associated with the PTRS group.

20 Claims, 9 Drawing Sheets

(56) References Cited

U.S. PATENT DOCUMENTS

| | | | | |
|---|---|---|---|---|
| 2014/0321399 | A1* | 10/2014 | Liu | H04W 72/23 |
| | | | | 370/329 |
| 2019/0334687 | A1* | 10/2019 | Su | H04L 5/0053 |
| 2021/0360599 | A1* | 11/2021 | Davydov | H04B 7/086 |
| 2022/0029870 | A1* | 1/2022 | Lu | H04J 13/0062 |
| 2023/0216604 | A1* | 7/2023 | Yu | H04L 1/0003 |
| | | | | 370/329 |
| 2023/0353291 | A1* | 11/2023 | Baskaran | H04L 1/1864 |

* cited by examiner

PHASE TRACKING REFERENCE SIGNAL FOR 6G WIRELESS COMMUNICATION

PRIORITY CLAIM

This application claims the benefit of priority to U.S. Provisional Patent Application Ser. No. 63/091,189, filed Oct. 13, 2020, which is incorporated herein by reference in its entirety.

TECHNICAL FIELD

Embodiments pertain to next generation wireless communications. In particular, some embodiments relate to phase tracking reference signals in sixth generation (6G) communications.

BACKGROUND

The use and complexity of wireless systems, which include 5th generation (5G) networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
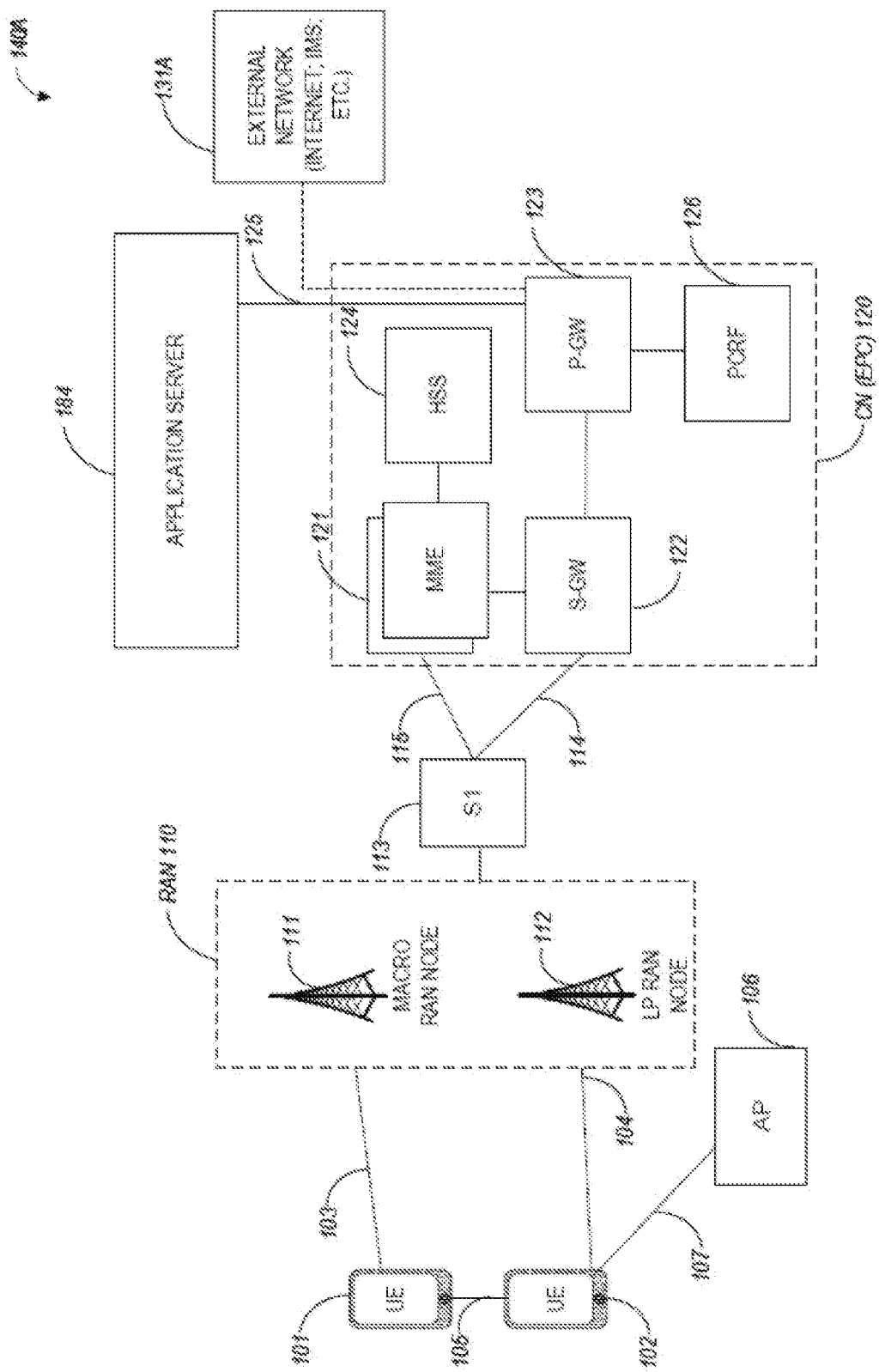
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and other frequencies and Spectrum Access System (SAS) in 3.55-3.7 GHZ and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/ 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
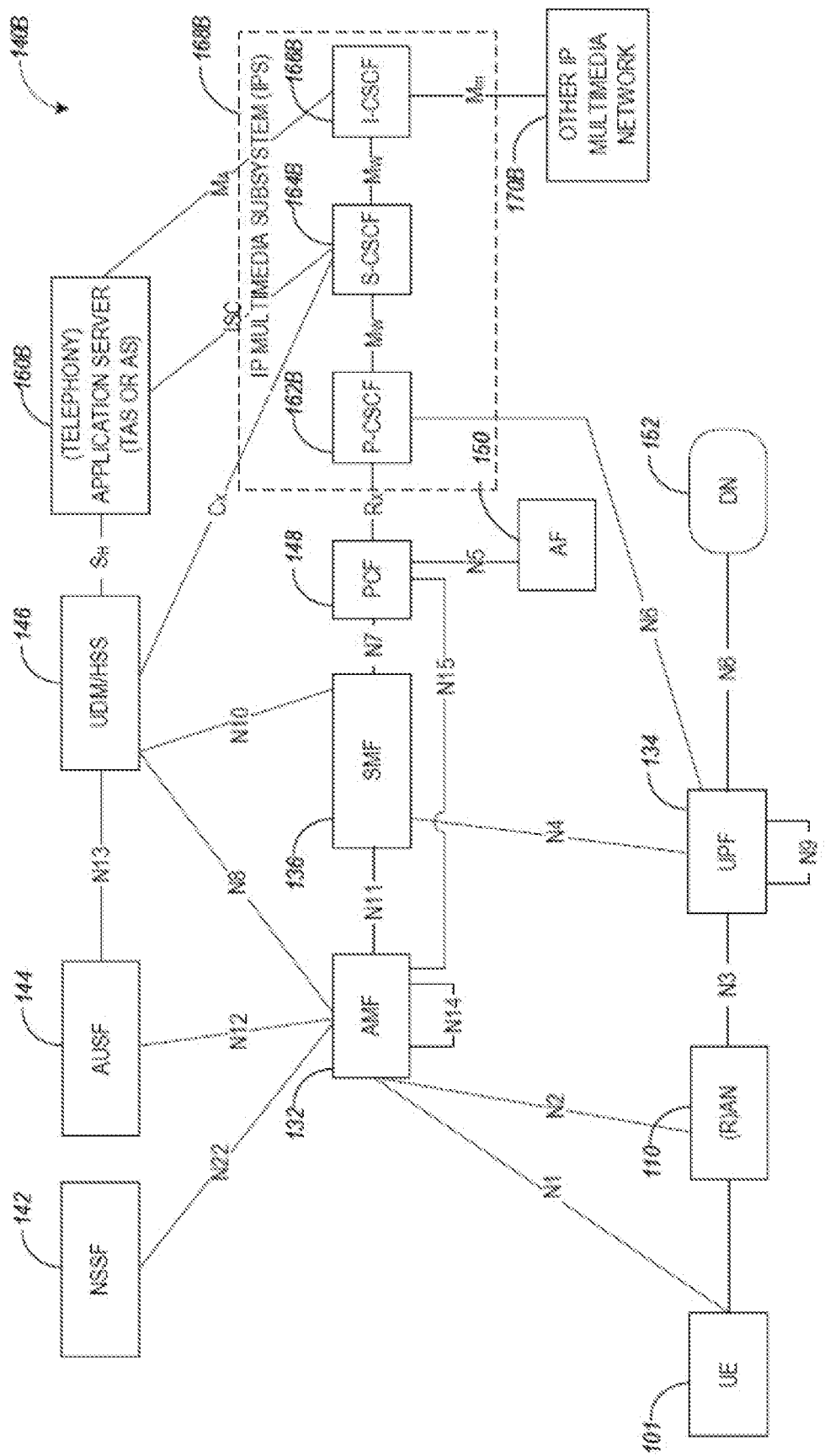
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
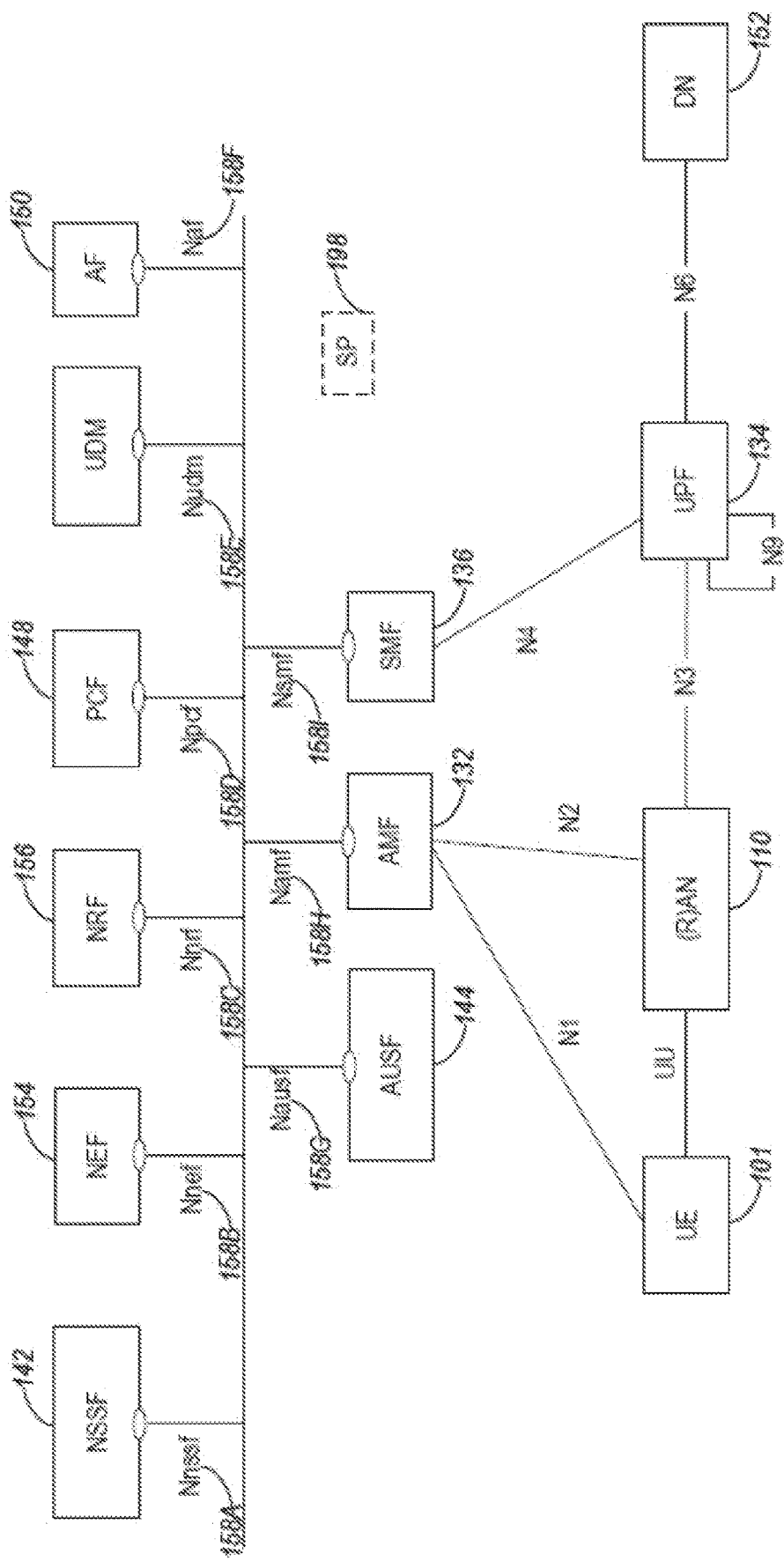
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
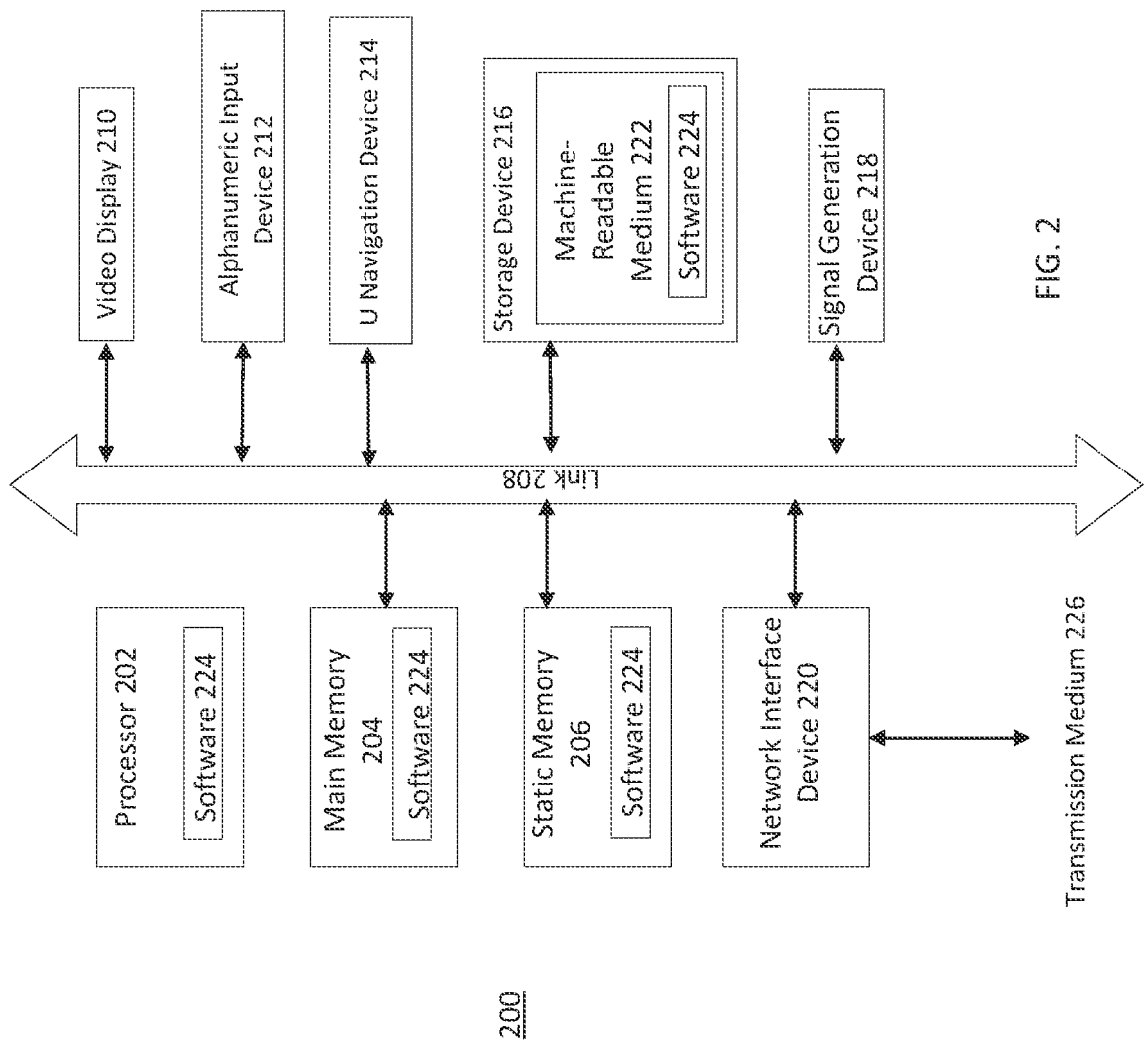
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHZ), ITS-GSB (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHZ)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHZ and further frequencies). Applicable spectrum bands include IMT (International Mobile Telecommunications) spectrum as well as other types of spectrum/bands, such as bands with national allocation (including 450-470 MHz, 902-928 MHZ (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHz, 2300-2400 MHZ, 2.4-2.4835 GHz (note: it is an ISM band with global availability and it is used by Wi-Fi technology family (11b/g/n/ax) and also by Bluetooth), 2500-2690 MHz, 698-790 MHZ, 610-790 MHz, 3400-3600 MHZ, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHZ, 31-31.3 GHZ, 37-38.6 GHZ, 38.6-40 GHz, 42-42.5 GHZ, 57-64 GHz, 71-76 GHz, 81-86 GHz and 92-94 GHz, etc), the ITS (Intelligent Transport Systems) band of 5.9 GHZ (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

Figure 3A:
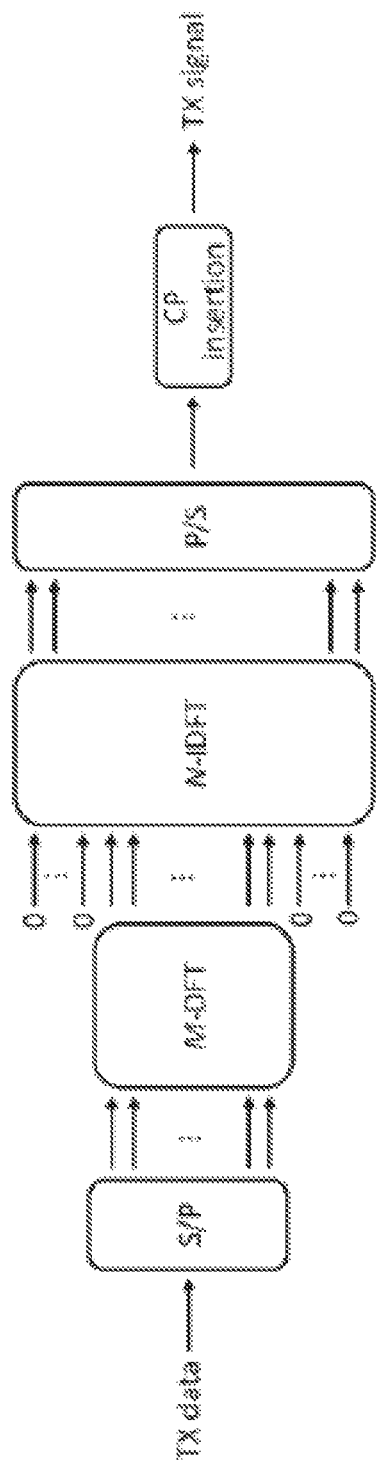
FIG. 3A illustrates a block diagram of a Direct Fourier Transform spread orthogonal frequency-division multiplexing (DFT-S-OFDM) transmitter in accordance with some aspects.
Figure 3B:
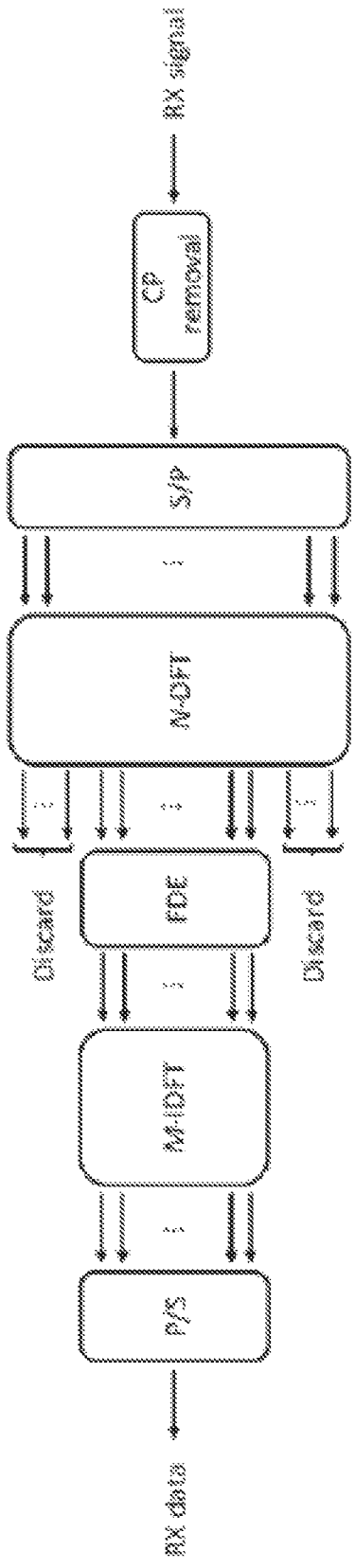
FIG. 3B illustrates a block diagram of a DFT-S-OFDM receiver in accordance with some aspects.

The DFT-S-OFDM waveform can be potentially used for 6G wireless communication thanks to its low peak to average power ratio (PAPR). FIG. 3A illustrates a block diagram of a DFT-S-OFDM transmitter in accordance with some aspects. FIG. 3B illustrates a block diagram of a DFT-S-OFDM receiver in accordance with some aspects. FIGS. 3A and 3B illustrate a DFT-s-OFDM waveform generation procedure. As shown in FIG. 3A, at the transmitter, data symbols first go through a serial-to-parallel (S/P) converter before being provided to a M-point discrete Fourier transformation (DFT). The output of the DFT is mapped to a contiguous region in the frequency domain of an OFDM symbol. The time-domain signal is generated through an N-point inverse FFT (IFFT) and subsequently a cyclic prefix is added. Reciprocally, as shown in FIG. 3B at the receiver side, an N-point FFT is performed after removal of the cyclic prefix. The data symbols at the mapped frequency region are then extracted. The transmitted symbols are recovered through an M-point inverse DFT (IDFT), which is then provided to a parallel-to-serial (P/S) converter. The M-point DFT is also referred to as transform precoding in 4G and 5G (new radio (NR)) systems, which is used interchangeably herein.

In 6G communication, data transmission may occur at higher frequencies than the frequency bands used by 5G communications. The phase noise (PN) of data transmissions at such 6G communication frequencies is a more significant factor, affecting data demodulation performance, than at 5G communication frequencies. The PN causes a phase change between the estimated channel from a demodulation reference signal (DM-RS) and the channel experienced by the following data OFDM symbols. Such a phase change is estimated and compensated for at the receiver using a PTRS.

Existing Rel-15 NR PTRS Design

Figure 4:
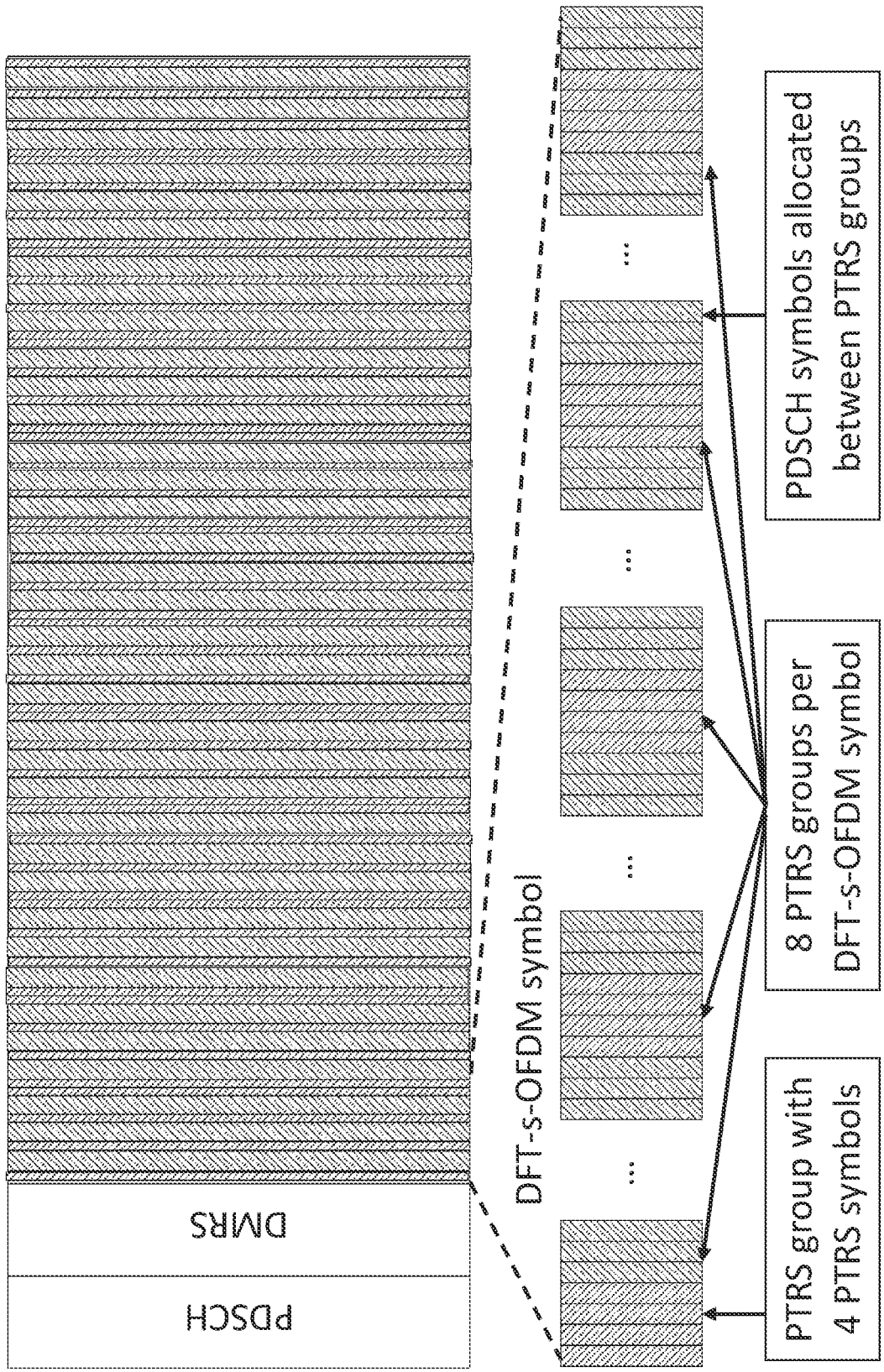
FIG. 4 illustrates phase tracking reference signal (PTRS) structures for DFTs-S-OFDM in accordance with some aspects.

FIG. 4 illustrates PTRS structures for DFTs-S-OFDM in accordance with some aspects. High-level 5G DFT-s-OFDM PTRS are illustrated in FIG. 4 together with DFT-s-OFDM symbol-wise PTRS allocation assuming maximum PTRS configuration.

Pre-DFT insertion, namely inserting PTRS in the time domain, is used due to its lower PAPR behavior and better PN compensation capabilities. More specifically, reference symbols are inserted before the DFT to enable sample-level time domain PN tracking.

NR defines different configurations for group-based time domain PTRS, where either 2 or 4 samples per group are used, and 2, 4, or 8 groups per DFT-s-OFDM symbol are supported (see 3GPP TS 38.211, Table 6.4.1.2.2.2-1, herein incorporated by reference). Thus, the maximum number of PTRS resources per DFT-s-OFDM symbol is 8×4=32, which results in an overhead of 1.5% per DFT-s-OFDM symbol when 12×180=2160 subcarriers are used.

The phase-tracking reference signal $r_m(m')$ to be mapped in position m before transform precoding, where m depends on the number of PT-RS groups $N_{group}^{PT-RS}$, the number of samples per PT-RS group $N_{samp}^{group}$, and $M_{sc}^{PUSCH}$ according to Table 2, shall be generated according to:

$$r_m(m') = w(k') \frac{e^{j\frac{\pi}{2}(m\,mod\,2)}}{\sqrt{2}} [(1 - 2c(m')) + j(1 - 2c(m'))]$$

$$m' = N_{samp}^{group} s' + k'$$

$$s' = 0, 1, \ldots, N_{group}^{PT-RS} - 1$$

$$k' = 0, 1, N_{samp}^{group} - 1$$

where c(i) is the pseudo-random bit sequence and w(i) is given by Table 1.

Therefore, the PTRS symbol is the multiplication of a random π/2-BPSK symbol expressed as $$\frac{e^{j\frac{\pi}{2}(m\,mod\,2)}}{\sqrt{2}} [(1 - 2c(m')) + j(1 - 2c(m'))]$$

and w(k') in Table 1. For a user equipment (UE), w(k') within a PTRS group is a function of UE identification and therefore is UE specific.

TABLE 1

The NR orthogonaal sequence w(i).

| $n_{RNTI} mod N_{samp}^{group}$ | $N_{samp}^{group} = 2$ [w(0) w(1)] | $N_{samp}^{group} = 4$ [w(0) w(1) w(2) w(3)] |
|---|---|---|
| 0 | [+1 +1] | [+1 +1 +1 +1] |
| 1 | [+1 −1] | [+1 −1 +1 −1] |
| 2 | — | [+1 +1 −1 −1] |
| 3 | — | [+1 −1 −1 +1] |

TABLE 2

NR PT-RS symbol mapping.

| Number of PT-RS groups $N_{group}^{PT-RS}$ | Number of samples per PT-RS group $N_{samp}^{group}$ | Index m of PT-RS samples in OFDM symbol/ prior to transform precoding |
|---|---|---|
| 2 | 2 | $\lfloor sM_{sc}^{PUSCH}/4 \rfloor + k - 1$ where $s = 1, 3$ and $k = 0, 1$ |
| 2 | 4 | $sM_{sc}^{PUSCH} + k$ where $\begin{cases} s = 0 \text{ and } k = 0, 1, 2, 3 \\ s = 1 \text{ and } k = -4, -3, -2, -1 \end{cases}$ |
| 4 | 2 | $\lfloor sM_{sc}^{PUSCH}/8 \rfloor + k - 1$ where $s = 1, 3, 5, 7$ and $k = 0, 1$ |
| 4 | 4 | $sM_{sc}^{PUSCH}/4 + n + k$ where $\begin{cases} s = 0 \text{ and } k = 0, 1, 2, 3 & n = 0 \\ s = 1, 2 \text{ and } k = -2, -1, 0, 1 & n = \lfloor M_{sc}^{PUSCH}/8 \rfloor \\ s = 4 \text{ and } k = -4, -3, -2, -1 & n = 0 \end{cases}$ |
| 8 | 4 | $\lfloor sM_{sc}^{PUSCH}/8 \rfloor + n + k$ where $\begin{cases} s = 0 \text{ and } k = 0, 1, 2, 3 & n = 0 \\ s = 1, 2, 3, 4, 5, 6 \text{ and } k = -2, -1, 0, 1 & n = \lfloor M_{sc}^{PUSCH}/16 \rfloor \\ s = 8 \text{ and } k = -4, -3, -2, -1 & n = 0 \end{cases}$ |

Motivations for Improving PTRS Design for 6G

To increase downlink data throughput, multiple base stations or transmission and reception points (TRPs) may be involved in the data transfer to a UE. Those base stations may not share the same frequency generation hardware because there are not co-located. In such a case, the phase change from the base stations will be different and thus the UE receiver is to estimate and compensate for the phase changes separately.

When either a base station transmits data in the downlink or a UE transmits data in the uplink, multiple antenna ports (APs) can be used to increase data throughput. The AP is a logical port used by NR that captures the channel experienced by a spatial data stream from the transmitter to the receiver. The data AP can be formed by one, or a combination, of: 1) digital precoding after transform precoding, 2) analog beamforming, and 3) antenna polarization. In such a case, even though both the transmitter and receiver use only one frequency generation hardware, which means that the PN is common to all data APs, the data APs could have different channel gains. Therefore, it is desirable to exploit the diversity of multi-AP transmission to increase the accuracy of phase change estimation resulting from PN.

Improved PTRS Design for 6G DFT-s-OFDM

Figure 5:
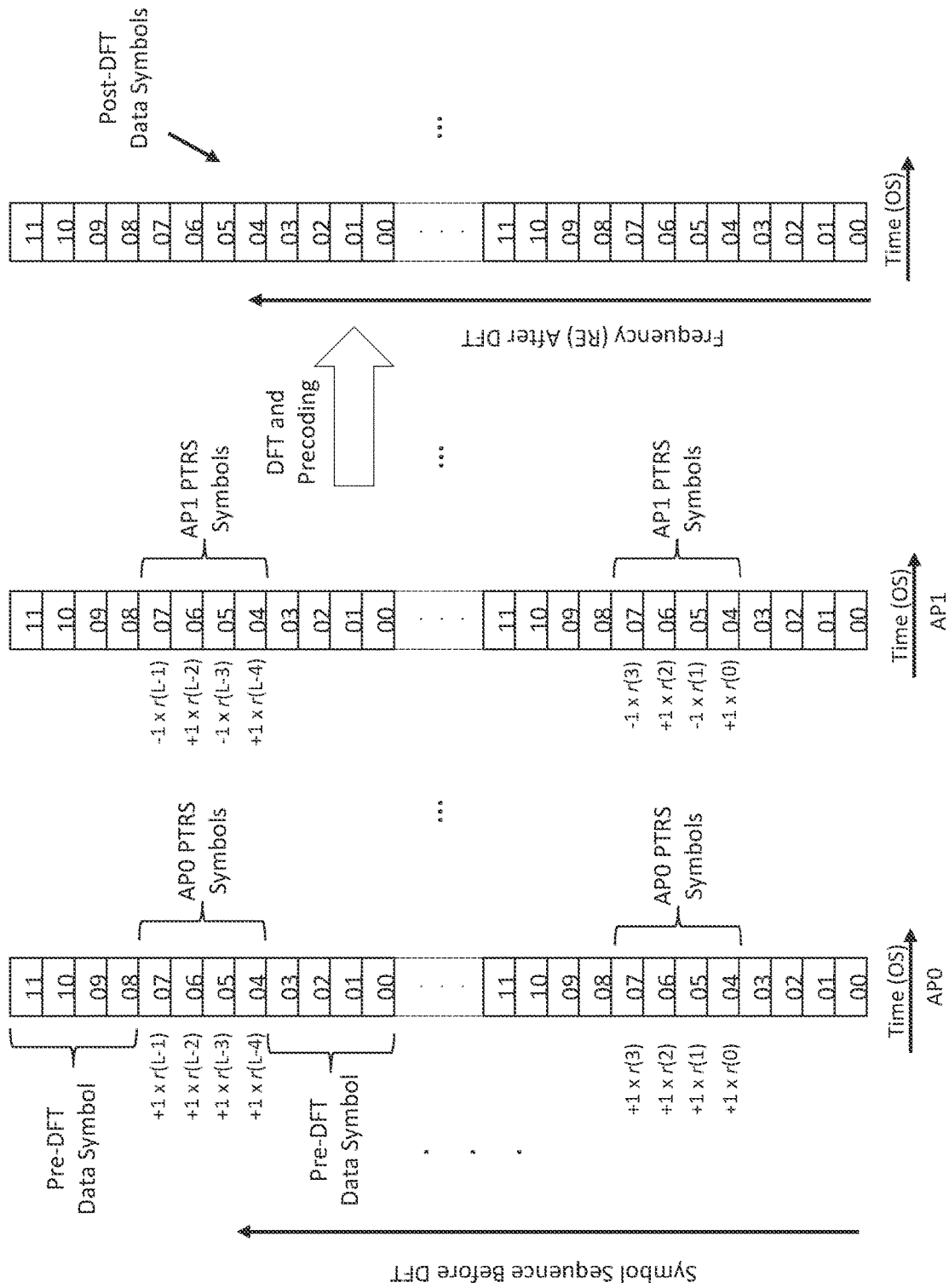
FIG. 5 illustrates 6G PTRS structures for DFTs-S-OFDM in accordance with some aspects.

FIG. 5 illustrates 6G PTRS structures for DFTs-S-OFDM in accordance with some aspects. Like NR, in FIG. 5, the PTRS symbols are inserted in the time domain before transform precoding. There are N_group PTRS groups with each group consisting of N_sample contiguous PTRS samples in a DFT-s-OFDM symbol.

Unlike NR, within each PTRS group, orthogonal cover codes (OCCs) are used to differentiate PTRS transmitted from different APs. For this reason, N_sample per PTRS group is greater than or equal to the number of APs used for transmitting the PTRS. In the example shown in FIG. 5, the orthogonal code [+1+1+1+1] is used by PTRS AP0 while [+1-1+1-1] is used by PTRS AP1. At a PTRS sample, a PTRS symbol is the multiplication between a randomly generated symbol, denoted by r in the example of FIG. 5, and an AP-specific OCC code. For low PAPR, the randomly generated symbol may be taken from a base sequence consisting of $\pi/2$-BPSK modulated symbols or Zadoff-Chu sequence.

After DFT transform precoding, each data layer is precoded according to its data AP precoding. An association may exist between the orthogonal codes of the PTRS AP and the orthogonal codes of the data AP. The association can be defined in the 6G specification. In one example, for a two-AP transmission, data AP0 is associated with PRTS AP0 using orthogonal code [+1+1+1+1] and data AP1 is associated with PRTS AP1 using orthogonal code [+1-1+1-1]. In a second example, for a four-AP transmission, both data AP0 and AP1 are associated with PRTS AP0 and both data AP2 and AP3 are associated with PRTS AP1.

If two or more PTRS APs share a common PN, the PN estimates from these PTRS APs can be combined at the receiver to improve performance. Such sharing information can be sent to the UE through one, or a combination, of a radio resource control (RRC) message, a media access control (MAC) control element (CE), or downlink control information (DCI).

Receiver Phase Tracking Algorithm

By distributing the PTRS symbols in the time domain and using orthogonal code for different PTRS APs, the receiver can track the time varying PN for each data AP within each DFT-s-OFDM symbol. In the receiver, after the frequency-domain channel equalization, the received DFT-s-OFDM signal is converted back to time domain using an IDFT. The randomly generated symbols are first removed from the PTRS samples. After orthogonal code removal, during which the PTRS symbols of different PTRS APs are separated, the PN estimate of each PTRS group and each PTRS AP is obtained as the mean rotation. PN estimates for a PTRS port sharing the same PN may be combined for performance improvement.

The estimated PN is used to compensate the data symbols that are associated with the estimated PN before the detection and decoding procedures. In one example, for each PTRS AP, one can use a simple linear interpolation of PN estimate of each PTRS group to get the estimated PN values between the time domain PTRS groups. In a second example, for each PTRS AP, the closest PN estimate among PTRS groups can be used to obtain the estimated PN values between the time domain PTRS groups. In a third example, for each PTRS AP, the PN estimates from all PTRS groups may be further averaged to obtain the estimated PN values to be used by the entire DFT-s-OFDM symbol. Note that with DFT-s-OFDM, the PTRS design allows a computationally efficient implementation to track and compensate time-varying PN response within a DFTs-OFDM symbol.

Figure 6:
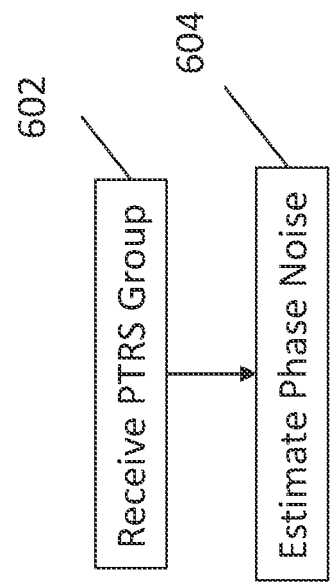
FIG. 6 illustrates a flowchart for estimation of phase noise in accordance with some aspects.

FIG. 6 illustrates a flowchart for estimation of phase noise in accordance with some aspects. In some embodiments, the electronic device(s), network(s), system(s), chip(s) or component(s), or portions or implementations thereof, of FIGS. 1A-1C and 2, may be configured to perform one or more processes, techniques, or methods as described herein, or portions thereof. In some embodiments, the process of FIG. 6 may be performed by a UE, an AP or a portion thereof. For example, the process may include, at operation 602, receiving a PTRS group. The PTRS group including a first PTRS sample transmitted on a first antenna port and a second PTRS sample transmitted on a second antenna port. The first and second PTRS samples are encoded with respective first and second OCCs. At operation 604, the process may further include estimating a first phase noise based on the first PTRS sample and a second phase noise based on the second PTRS sample.

Figure 7:
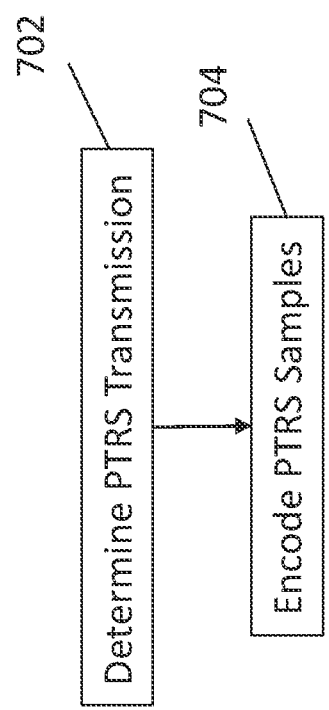
FIG. 7 illustrates a flowchart for transmission of OFDM signals in accordance with some aspects.

FIG. 7 illustrates a flowchart for transmission of OFDM signals in accordance with some aspects. In some embodiments, the process of FIG. 7 may be performed by a UE, an AP or a portion thereof. At operation 702, the process may include determining an OCC-designated transmission of a PTRS on an antenna port. At operation 704, the process may further include encoding one or more PTRS samples based on the OCC for transmission to a UE on the antenna port within a PTRS group.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a transmission and reception point (TRP), the apparatus comprising:
    processing circuitry configured to:
        generate phase tracking reference signal (PTRS) symbols in a PTRS group through use of an access port (AP)-specific orthogonal cover code (OCC), the AP-specific OCC dependent on an AP used to transmit the PTRS symbols;
        interleave, in a time domain, the PTRS group between data symbols to form a data vector;
        perform a discrete Fourier transformation (DFT) on the data vector;
        map an output of the DFT to a contiguous region in a frequency domain of an orthogonal frequency-division multiplexing (OFDM) symbol;
        apply an inverse FFT (IFFT) to the OFDM symbol to generate a time-domain signal; and
        add a cyclic prefix to the time-domain signal to generate a Direct Fourier Transform spread orthogonal frequency-division multiplexing (DFT-S-OFDM) signal for transmission to a user equipment (UE); and
    a memory configured to store the AP-specific OCC.

2. The apparatus of claim 1, wherein:
    the OFDM symbol includes multiple PTRS groups,
    each PTRS group contains contiguous PTRS symbols, and
    the processing circuitry is further configured to generate, for each PTRS group, the contiguous PTRS symbols through application of the AP-specific OCC to contiguous PTRS symbols in the PTRS group prior to formation of the data vector.

3. The apparatus of claim 2, wherein a length of the AP-specific OCC code is equal to a number of PTRS symbols contained in each PTRS group.

4. The apparatus of claim 1, wherein the processing circuitry is further configured to generate each of the PTRS symbols through multiplication of a randomly generated symbol to one element of the AP-specific OCC code.

5. The apparatus of claim 4, wherein the processing circuitry is further configured to generate the randomly generated symbol using a base sequence of π/2-BPSK modulated symbols or a Zadoff-Chu sequence.

6. The apparatus of claim 4, wherein:
    the data vector contains multiple sets of PTRS symbols from multiple PTRS APs, and
    the processing circuitry is further configured to apply a common randomly generated symbol to all PTRS APs at a same relative PTRS symbol position.

7. The apparatus of claim 1, wherein:
    a data AP is formed by at least one of: digital precoding after transform precoding, analog beamforming, or antenna polarization, and
    an association exists between OCCs of a PTRS AP and OCCs of the data AP.

8. The apparatus of claim 7, wherein the OCCs of multiple data APs are associated with the OCCs of a single PTRS AP.

9. The apparatus of claim 8, wherein:
    the processing circuitry is further configured to generate multiple DFT-S-OFDM signals for transmission to the UE using different PTRS APs and apply a different OCC for each PTRS AP,
    the different PTRS APs share a common phase noise (PN), and
    the processing circuitry is further configured to combine PN estimates of the different PTRS APs to improve performance.

10. The apparatus of claim 9, wherein the processing circuitry is further configured to encode a combination of the PN estimates for transmission to the UE through at least one of: a radio resource control (RRC) message, a media access control (MAC) control element (CE), or downlink control information (DCI).

11. An apparatus for a user equipment (UE), the apparatus comprising:
    processing circuitry configured to:
        decode a Direct Fourier Transform spread orthogonal frequency-division multiplexing (DFT-S-OFDM) signal from at least one antenna port (AP) of a transmission and reception point (TRP), the DFT-S-OFDM signal containing a phase-tracking reference signal (PTRS) group that includes PTRS symbols encoded with an AP-specific orthogonal cover code (OCC);
        extract the PTRS symbols;
        estimate a phase noise (PN) based on the PTRS symbols; and
        compensate data symbols of the DFT-S-OFDM signal associated with the PTRS symbols for the PN; and
    a memory configured to store the AP-specific OCC.

12. The apparatus of claim 11, wherein to extract the PTRS symbols, the processing circuitry is configured to:
    convert the DFT-S-OFDM signal to a time domain using an inverse DFT (IDFT); and remove randomly generated symbols and the AP-specific OCC from the PTRS symbols after conversion of the DFT-S-OFDM signal to the time domain.

13. The apparatus of claim 11, wherein the processing circuitry is configured to:
   decode DFT-S-OFDM signals from a plurality of PTRS APs;
   separate PTRS symbols of the PTRS APs after the DFT-S-OFDM signals have been decoded, the PTRS symbols of each PTRS AP being provided in a plurality of PTRS groups; and
   estimate the PN of each DFT-S-OFDM signal through estimation of the PN of each PTRS group and each PTRS AP as a mean rotation.

14. The apparatus of claim 13, wherein the processing circuitry is configured to combine the PN of each PTRS AP having a same PN estimate.

15. The apparatus of claim 11, wherein:
   the PTRS symbols are provided in a plurality of PTRS groups, and
   the processing circuitry is configured to use a linear interpolation of a PN estimate of data symbols between adjacent PTRS groups to obtain estimated PN values between the adjacent PTRS groups to track and compensate for a time-varying PN response within the DFT-S-OFDM symbol.

16. The apparatus of claim 11, wherein a length of the AP-specific OCC code is equal to a number of PTRS symbols contained in the PTRS group.

17. The apparatus of claim 11, wherein:
   the PTRS symbols comprise multiplication of a randomly generated symbol to one element of the AP-specific OCC code, and
   the randomly generated symbol is based on a base sequence of $\pi/2$-BPSK modulated symbols or a Zadoff-Chu sequence.

18. A non-transitory computer-readable storage medium that stores instructions for execution by one or more processors of a transmission and reception point (TRP), the one or more processors to configure the TRP to, when the instructions are executed:
   apply an access port (AP)-specific orthogonal cover code (OCC) to phase tracking reference signal (PTRS) symbols in each of a plurality of PTRS groups, the AP-specific OCC dependent on a PTRS AP;
   insert, after application of the AP-specific OCC, each PTRS group into data symbols to form a data vector, the PTRS groups separated from each other by a plurality of the data symbols, and
   perform transform precoding on the data vector prior to transmission of Direct Fourier Transform spread orthogonal frequency-division multiplexing (DFT-S-OFDM) signal associated with the data vector to a user equipment (UE).

19. The medium of claim 18, wherein each PTRS group contains contiguous PTRS symbols, the PTRS symbol in a same relative location in each of the PTRS groups having a same element of the AP-specific OCC applied thereto.

20. The medium of claim 18, wherein a length of the AP-specific OCC code is equal to a number of PTRS symbols contained in each PTRS group.

* * * * *